United States Patent [19]
Porter

[11] Patent Number: 5,948,849
[45] Date of Patent: Sep. 7, 1999

[54] WEATHERABLE COATING FOR STAINED COMPOSITE THERMOSET OR THERMOPLASTIC SURFACE PLASTIC BUILDING PRODUCTS

[75] Inventor: Cem A. Porter, Garrett, Ind.

[73] Assignee: Therma-Tru Corporation, Maumee, Ohio

[21] Appl. No.: 08/912,443

[22] Filed: Aug. 18, 1997

[51] Int. Cl.⁶ .......................... C08L 83/04; C08L 55/04; C08L 91/00; C08K 5/01
[52] U.S. Cl. ..................... 524/506; 524/554; 524/501; 106/253
[58] Field of Search .............. 106/253; 524/506, 524/554, 501

[56] References Cited

U.S. PATENT DOCUMENTS

| | | | |
|---|---|---|---|
| 2,869,722 | 1/1959 | Marander et al. | 524/501 |
| 2,881,144 | 4/1959 | Cohen et al. | 106/253 |
| 3,062,764 | 11/1962 | Osdal | 524/506 |
| 4,509,981 | 4/1985 | Sanders et al. | 106/3 |
| 4,616,064 | 10/1986 | Zukosky et al. | 525/92 |
| 4,872,867 | 10/1989 | Joh | 604/269 |
| 4,913,972 | 4/1990 | Grunewalder et al. | 428/425.5 |
| 4,923,760 | 5/1990 | Adkins et al. | 428/541 |
| 5,288,805 | 2/1994 | Kodali | 525/190 |
| 5,342,882 | 8/1994 | Gobel et al. | 524/832 |
| 5,360,851 | 11/1994 | Feder et al. | 524/506 |
| 5,693,715 | 12/1997 | Kodali . | |
| 5,712,335 | 1/1998 | Tsuda et al. | 524/506 |

FOREIGN PATENT DOCUMENTS

| | | | |
|---|---|---|---|
| 180563 | 10/1983 | Japan | 524/506 |
| 267377 | 11/1987 | Japan | 524/501 |

OTHER PUBLICATIONS

The Detroit Society for Coatings Technology, L. Price et al., "Cure Behavior of Silicone–Epoxies and Urethane Modified Acrylates in Interpenetrating Polymer Networks," *1994 Constituent Society Paper*, Oct. 13, 1994, New Orleans, La., pp. 65–72.

*Primary Examiner*—Peter A. Szekely
*Attorney, Agent, or Firm*—Brooks & Kushman P.C.

[57] ABSTRACT

A stain/topcoat system for non-porous thermoset and/or thermoplastic articles comprises a pigmented stain having substantially only a single binder resin which promotes adherence of a topcoat, and a topcoat which is an aqueous dispersion of a film forming polymer and a curable organopolysiloxane microemulsion. The topcoat displays exceptional adhesion and weatherability to pigmented stained surfaces.

22 Claims, No Drawings

WEATHERABLE COATING FOR STAINED COMPOSITE THERMOSET OR THERMOPLASTIC SURFACE PLASTIC BUILDING PRODUCTS

FIELD OF THE INVENTION

The present invention pertains to weatherable coating systems suitable for application to thermoset or thermoplastic composite surfaces having minimal surface porosity. More particularly, the present invention pertains to a stain, a topcoat, and to a stain and topcoat system which can be easily applied by the consumer to produce an aesthetic, weatherable surface, particularly on exterior doors and door entry components.

BACKGROUND OF THE INVENTION

Conventional finishing methods for exterior doors and door system components, where a traditional finely finished wood grain appearance is desired, have involved staining a bare wood surface with dye and/or pigment-bearing stains followed by application of one or more coats of exterior varnish. A seal coat is sometimes applied prior to the stain and topcoat to seal the pores of the wood and to promote a more adherent and uniform stain and topcoat. The stain is virtually always solvent borne, as water based stains have the effect of raising the grain, thus requiring an intermediate sanding step which is labor and time intensive. In addition to the solvent contained in the stain, stains contain drying oils as carriers, for example heat-bodied linseed oil. Generally, several different oils are provided to promote penetration of the stain into the wood surface.

After the stain has dried, one or more transparent topcoats are applied. Traditional topcoats are varnishes containing dissolved resins such as copal, often in conjunction with a drying oil. More recently, chemically modified natural resins and synthetic polymers have replaced all or part of natural resins, especially for outdoor use. In addition, to provide superior weatherability, ultraviolet absorbers have been added. Despite the advances made in such finishes, varnishes still generally require light sanding or abrading with steel wool or the like between coats, or necessitate the addition of the second coat prior to the full drying of the previous coat. Otherwise, delamination between varnish coats may occur. Sanding and similar treatments are time consuming, and judging the proper time to apply a second coat onto a not fully-cured prior coat requires some skill and experience. Despite these drawbacks, stain/varnish systems continue to be used on exterior door systems.

Recently, high quality exterior door systems employing molded thermoset and/or thermoplastic composite skins have become commercially available. These door systems are compression molded to exhibit a wood grain appearance, and when properly finished, are difficult to distinguish from natural wood doors. These composite doors offer several advantages over natural wood products, such as freedom from warpage, lower cost, greater insulation efficiency, and the like. Unfortunately, the stain/varnish systems in use for finishing natural wood doors are only marginally acceptable for composite doors. A satisfactory finish may often be achieved under production conditions where skilled workers, sophisticated spray equipment, drying ovens and the like are available. However, such systems are ill-suited for application by the consumer.

The difference between the ease with which finishes may be applied to natural wood products on the one hand and composite exterior door systems on the other, is due to the nature of the materials involved. Natural wood is a porous and absorbent product. Hence, dyes may penetrate the wood fibers as well as into the wood pores. The latter may also serve to trap and retain pigment, as may partially abraded fibers generated in sanding the wood prior to finishing. However, composite door skins are constructed of sheet molding compound (SMC) or other thermoset or thermoplastic matrices, often containing fillers which may range from wood flour to finely ground minerals and/or glass fibers. Despite the presence of fillers, the composite door skins are essentially non-porous. Thus, stains containing dyes as the colorant are largely ineffectual, and pigmented stains require a higher amount of pigment than would be required for a conventional wood stain. The lack of porosity and the generally smooth surface of such products require the stain pigments to be physically adhered to the surface.

Furthermore, the drying oils used in conventional stains, particularly those of lower viscosity, act as subsurface emollients in wood, but remain as an exterior thin film on composite skins. Lower molecular weight oils, being unable to penetrate the essentially non-porous surface, may remain tacky or require lengthy drying times or oven cure. During weathering due to light exposure, these oils experience scission of naturally occurring unsaturated molecular sites. The scission produces a variety of lower molecular weight, liquid and often volatile components, which causes the subsequently applied topcoat to blister, coming off in sheets.

The detrimental effects of drying oil vehicles may be minimized by substituting quickly evaporating solvents such as mineral spirits, naphtha, or the like. However, such stains tend to dry rapidly, leaving application marks, i.e., "brush marks" where overlapping coats of stain are applied. Elimination of drying oil components results in little adherence of pigment to the surface. This minimal adherence may be acceptable in porous products, but is highly problematic when non-porous surfaces are involved.

Adkins, et al., in U.S. Pat. No. 4,923,760, discloses water-borne emulsions employing two different maleinized linseed oils together with cosolvents such as propylene gylcol tertiary butyl ether and a variety of hydrocarbons. However, such stains are still formulated for porous wood surfaces and are not well suited to non-porous composite door skins. Lowering the amount of the oil vehicles would be appropriate, but the stains then dry too fast and have only a limited capacity to stably disperse pigment.

Pigmented stains, whether solvent-borne or water borne, are traditionally protected by aromatic polyurethane topcoats. When the previously deposited stain contains low levels of scissionable drying oils, failure by blistering and peeling is substantially minimized. However, aromatic polyurethanes are subject to severe degradation by light. Exposure to sunlight causes degradation which ultimately results in ablative loss of the coating when applied to non-porous surfaces. Polyurethane varnishes often contain sacrificial ultraviolet (UV) protectants. However, the ultraviolet light protection package is typically consumed in as few as eight months exposure to sunlight. As the stain coat is not strongly adhered to non-porous substrates, failure of the topcoat results in ablative loss of the stain layer, typically in less than two months after the topcoat is breached.

Aqueous topcoats have been used with some success, as indicated by the disclosures of U.S. patents to Gobel et al. (U.S. Pat. No. 5,342,882) and Sanders et al. (U.S. Pat. No. 4,509,981). Water-based topcoats employing aliphatic urethane-acrylic latexes are commercially available. The use of a non-sacrificial UV protectant package in these coating compositions provides a substantial increase in durability of underlying resin-bound solid pigmented coating relative to the degree of protection provided by aromatic polyurethane finishes. However, these finishes are incompatible with pigmented stains having little or no resin binder and high pigment loading. This incompatibility is believed due to the relative differences between the somewhat hydrophilic pigment particles and the hydrophobic topcoat.

It would be desirable to provide a pigmented stain suitable for use on relatively non-porous thermoset and thermoplastic composite surfaces, particularly door skins. It would be further desirable to provide such pigmented stains in a formulation which can easily be applied by the consumer in a uniform manner, without resort to the use of expensive and not readily available production equipment. It would be yet further desirable to provide a topcoat which is compatible with the pigmented stain, and which exhibits a high, continuing degree of ultraviolet protection and weathering resistance. The stain/topcoat system should not employ two-component coatings with limited pot life, and should be removable by traditional paint strippers should the need arise.

SUMMARY OF THE INVENTION

The present invention pertains to a pigmented stain containing a unique resin binder, which is highly effective to stain thermoset and/or thermoplastic, essentially non-porous surfaces; and to an aqueous, transparent topcoat which is compatible therewith. The stain/topcoat system provides a finish system which is suitable for consumer application, which can be removed by conventional paint strippers, and which, following application, presents a highly aesthetic, weatherable surface.

DESCRIPTION OF THE PREFERRED EMBODIMENTS

The pigmented stain of the present invention contains a high loading of pigments necessary to impart the degree of coloration required for non-porous thermoset and/or thermoplastic composite materials, particularly door skins, trim, etc., and a specific resin binder, in a solvent system which preferably employs a tail vehicle in addition to conventional fast drying solvents. The resin binder is a dicyclopentadiene-modified drying oil as disclosed by U.S. Pat. No. 5,288,805, herein incorporated by reference, and commercially available as DILULIN™ copolymer resins from Cargill, Inc. It has been surprisingly found that one copolymer resin is adequate not only to provide the requisite adhesion of pigment to substrate, but also, in conjunction with the formulation of the topcoat, to allow for the use of large amounts of pigment in the stain without compatibility problems. Thus, it is preferred that the dicyclopentadiene-modified drying oils constitute the largest part, and preferably all or substantially all of the resin binder.

The dicyclopentadiene-modified drying oil is preferably prepared by reacting dicyclopentadiene in an amount of from about 10 weight percent to about 40 weight percent with a drying oil or mixture of drying oils having relatively high iodine numbers, preferably above 150, and more preferably in the range of 170 to 195. Linseed oil is the preferred drying oil, however other oils such as tung oil, dehydrated castor oil, and other oils may be used as well, or in admixture with linseed oil. The dicyclopentadiene is added to the drying oil in small increments at relatively high temperature, i.e., 250–270° C. with stirring. It is believed that the dicyclopentadiene is converted to cyclopentadiene which then reacts with the unsaturated sites of the drying oils in a Diels-Alder reaction. The preparation of such modified oils and their use with oil-modified polyurethanes in polyurethane varnish is disclosed in U.S. Pat. No. 5,288,805.

The dicyclopentadiene-modified linseed oil is present in the stain in an amount of from about 20 weight percent to about 45 weight percent, more preferably 30 to 40 weight percent, and most preferably about 32 to 38 weight percent. The pigment loading is from about 15 weight percent to about 35 weight percent, more preferably 20 weight percent to about 30 weight percent, and most preferably about 25 to 30 weight percent. Solvents are present in amounts of about 20 weight percent to 40 weight percent, more preferably 25 to 35 weight percent, and most preferably about 30–35 weight percent. Of the total solvents, approximately 10 weight percent to about 30 weight percent, preferably 15 weight percent to about 25 weight percent are slowly evaporating solvents commonly known as "tail solvents." The remainder of the solvents exhibit fast to moderate evaporation, such as mineral spirits, naphtha, solvent 142 petroleum distillate, and the like. It is preferred to use combinations of these faster evaporating solvents such that the solvents flash off at different intervals. The majority of solvent, i.e., >50%, should flash off within a period of from 2 to 10 minutes. Most preferably, solvent 142 petroleum distillate, mineral spirits, and tridecyl alcohol tail solvent are employed in a weight ratio of about 10:10:5, with the weight ratio of dicyclopentadiene-modified linseed oil to tail solvent being approximately 3:1.

In addition to pigments, dicyclopentadiene-modified linseed oil, and solvents, the stain may contain other known additives, for example, leveling agents; drying agents, i.e., metal naphthenates such as cobalt naphthenate, calcium naphthenate, and magnesium naphthenate; ultraviolet absorbers, preferably of the non-sacrificial type, i.e., hindered amine stabilizers such as TINUVIN® 292 stabilizer and TINUVIN® 328 stabilizer; wax; thickeners such as various clay minerals; and the like. The stain is preferably free of ordinary drying oils such as unmodified or bodied linseed oil, tung oil, and the like; and is preferably also free of other secondary resins such as urethane resins and oil-modified alkyd polymers.

The preparation of the stain is not overly critical, and may be performed by conventional paint preparation techniques. For example, the pigments, in standard commercial grade, are added to a first portion of the dicyclopentadiene-modified linseed oil and well blended in a mixing tank, three roll mill, Cowles mixer, etc. Sand milling or ball milling may also be used. In some cases, pigment size reduction is desired in addition to full wetting of the pigment-surface. A surfactant such as BYK™ 156 may aid in dispersing and wetting the pigment with the resin binder. Following wetting of the pigment and any desired size reduction, the resulting mill base is diluted with solvent, additional resin added, and various driers, leveling agents, thickeners, and the like are added. Blending of the mixture is continued until a uniform dispersion is obtained.

The stain may be applied to the non-porous thermoset and/or thermoplastic composite by conventional means, i.e., by brushing, spraying, sponging, rolling, wiping, and the like. In general, excess stain is removed by wiping with a clean lint free rag or the like, but preferably by means of a china bristle brush. The stain is generally applied at temperatures between 5° C. and 45° C., and should be allowed to dry for approximately 48 hours at room temperature under dry conditions. Drying time may be adjusted depending upon the temperature and humidity. After the stain is dry, the topcoat may be applied.

The topcoat exhibits unexpectedly excellent compatibility with the inventive stain layer, particularly so in view of the fact that the topcoat is an aqueous composition. The topcoat comprises a non-siloxane, film-forming polymer latex, preferably an acrylic latex; an aliphatic or aromatic polyurethane latex, most preferably an aliphatic polyurethane latex; an acrylic vinyl latex; an acrylic polyurethane latex; an acrylic polyester latex; mixtures of the above, and the like. Most preferably FLEXTHANE® urethane-modified acrylate resins available from Air Products are used. The pH of the aqueous latexes must be suitable for the dispersed phase, and is preferably between 8 and 11, adjusted by addition of suitable acid or alkaline additives, particularly with ammonium hydroxide. FLEXTHANE® 620 is particularly preferred as the film forming polymer.

The term "latex" as used herein pertains to an emulsion, microemulsion, or dispersion of the respective polymer as a discontinuous phase in water as a continuous phase. The particle size is not overly critical, and may vary, for example, from smaller than 0.001 $\mu$m to 2 $\mu$m or larger, preferably from 0.01 $\mu$m to 0.5 $\mu$m. The dispersed phase will preferably remain stably dispersed in the continuous phase. If the dispersed phase settles or separates, it should be readily redispersible by means of simple agitation, as by stirring or the use of a paint mixer or the like. Latexes with small particle sizes are preferred. By the term "dispersible" as it applies to the non-siloxane, film-forming polymer, is meant that the polymer may be dispersed or emulsified in water to form a latex as that term is used herein.

The topcoat composition may contain conventional additives such as cosolvents, leveling agents, flatting agents, emulsifiers and emulsion stabilizers, biocides, thickeners, suspending agents, and in particular, ultraviolet protection additives. Examples of suitable cosolvents include the various glycol ethers and acetates available from the Dow Chemical Company under the tradename DOWANOL® glycol ethers and acetates. Aliphatic alcohol cosolvents such as methanol, ethanol, n-propanol, 2-propanol, n-butanol, 2-ethylhexanol, tridecyl alcohol, and the like may be used, as can also ketones such as methylethylketone, 2-pentanone, cyclohexanone; and aliphatic and aliphatic hydrocarbons. The latter may be used in quantities such that stable emulsions may be maintained.

The key to the compatibility and weatherability of the topcoat, however, is due to the presence of an organopolysiloxane microemulsion, preferably one containing one or more curable or crosslinkable organopolysiloxanes. The presence of this microemulsion is believed to alter the hydrophobicity of the topcoat, rendering the latter compatible with the stain formulation of the present invention. Alkoxyalkyl-functional organopolysiloxanes such as Wacker Silicones 43A organopolysiloxane are suitable, for example. Although siloxane microemulsions are preferred for use herein, stable emulsions containing larger particle sizes are useful as well.

The organopolysiloxanes are curable organopolysiloxanes which are readily available. Such curable organopolysiloxanes have reactive functional groups such as alkoxy, silanol, chloro, hydrido, acetoxy, and the like. The functional groups may be terminal groups or may be distributed along the polysiloxane chain. Preferably, the average functionality of the organopolysiloxanes is greater than two such that a crosslinked thermoset polymer is obtained upon cure. However, lower functionality organopolysiloxanes are also suitable, so long as the improved topcoat weatherability is maintained. Suitable organopolysiloxanes are identified in U.S. Pat. No. 4,913,972, which is herein incorporated by reference. A preferred organopolysiloxane is Wacker 43A organopolysiloxane, available from Wacker Silicones, Adrian, Mich. Organopolysiloxanes which contain unsaturated organic groups such as allyl-, vinyl-, vinylether-, and other unsaturation-functional groups are also useful. These organopolysiloxanes may further crosslink under the influence of light exposure.

The term "curable" includes resins which are crosslinkable as well. The term "curable" is intended to reflect a curing reaction which creates a higher molecular weight cured polymer as compared to the molecular weight of the uncured organopolysiloxane. By the term "molecular weight" is meant number average molecular weight.

In addition to the curable organopolysiloxane, the topcoat may contain other organopolysiloxanes which promote water beading. These organopolysiloxanes may be curable, may be essentially inert, or may interact with other system components such as the film-forming polymer either by chemical reaction or polar or ionic attraction. Examples of water beading agents are trimethylsiloxy end-capped polydimethysiloxanes, $\alpha,\omega$-dihydroxypolydimethylsiloxanes, and in particular, amino-functional organopolysiloxanes, for example $\alpha,\omega$-[3-aminopropyl]polydimethylsiloxanes. A preferred beading agent is Wacker Silicones BS 1306 organopolysiloxane.

The topcoat preferably contains in weight percent from about 35 to 60 percent water, preferably 40–55 percent water, and more preferably about 45–55 percent water; from about 25 to about 55 percent film forming polymer, preferably from about 35 to about 50 percent, and more preferably about 35 to about 45 percent; from about 2 to about 25 percent organopolysiloxane, preferably from about 3 to 10 percent, and more preferably from about 3 to about 8 percent; and sufficient surfactant to provide a stable dispersion, preferably about 1 to about 8 percent, preferably about 1 to about 5 percent, and most preferably about 2 to about 4 percent. The surfactants may be anionic, cationic, amphoteric, or non-ionic. Mixtures of various surfactants may be used. The type of surfactant should be tailored to the type of polymer latex. For example, anionic polymer latexes may be adversely affected by the use of large quantities of cationic surfactants, as coagulation may occur. The selection of suitable surfactants is within the skill of the art once the general formulation is known.

In addition to the above ingredients, the topcoat preferably contains an ultraviolet protection package. This package may contain one or more ultraviolet absorbers, preferably of the non-sacrificial type. Finely divided inorganic particles in the nanosize range, particularly those which are colorless (white) may be used as an ultraviolet absorber. Examples are titanium dioxide, silica, and various ceramic materials. The fine particle size is generally provided by flame pyrolysis or spray pyrolysis. Such UV absorbing particles may be used in amounts up to about 5 percent by weight, preferably from about 0.1 weight percent to about 2 weight percent, and more preferably about 0.2 weight percent to about 1 weight percent.

In addition to finely divided inorganic particle UV absorbers, soluble or dispersible organic absorbers such as hindered amines, cinnamic acid esters, and the like may be used, generally in amounts up to about 5 weight percent, more preferably 0.1 to about 3 weight percent, and most preferably from about 0.5 to about 2 weight percent. Preferred UV absorbers are the various TINUVIN absorbers available from Ciba Geigy.

Without wishing to be bound to any particular theory, the inventive topcoat of the subject invention is believed to comprise an interpenetrating polymer network. Thus, it is believed that the polyurethane polymer and polysiloxane polymer cure in such a fashion that the polymers form a complex network which assists in producing a weatherable coating. This conclusion is based in part on the drying/curing behavior whereby the topcoat clears as it dries, indicating little phase separation; and also upon the fact that if siloxane is added too rapidly during topcoat preparation, soft balls of gelatinous polymer may form. It is generally known in the wood finishing arts that polysiloxanes should be avoided during finishing operations to avoid surface defects such as "orange peel" and "cats eyes." The fact that relatively large amounts of polysiloxane remain compatible with the film forming polymer may be due to the formation of an interpenetrating network which then effectively prevents phase separation.

Interpenetrating polymer networks have been disclosed as antithrombogenic polymers in U.S. Pat. Nos. 4,872,867 and 4,6616,064. However, the IPNs of the former are prepared in strong aprotic solvents, while the IPNs of the latter were prepared in the melt. Neither of these techniques can be used for transparent topcoats. Further solvent-borne IPNs prepared from urethane modified acrylates and both siliconized and non-siliconized epoxy resins are presented in "Cure Behavior of Silicone-Epoxies and Urethane Modified Acrylates in Interpenetrating Networks", J. COATINGS TECH. Vol. 68, No. 854, March 1996, pp 65–72.

The stain/topcoat system of the present invention displays excellent weatherability, as measured by ASTM G53-88 accelerated weathering test. Moreover, the topcoat itself, even when used over conventional oil-based stains, also displays excellent weatherability. The weatherability should exceed 1500 hours minimally by the above test, should preferably exceed 2000 hours, more preferably 2500 hours, and most preferably exceeds 3000 hours.

The preparation of the aqueous topcoat may be performed in numerous ways. However, the addition of the polysiloxane compound must be accomplished in such a manner so as to prepare a stable microemulsion. Simply adding the entire amount of siloxane at one time is generally ineffectual. It has been found advantageous to prepare a mill base containing the film forming polymer and other non-siloxane additives and utilize water or a portion of the mill base to form a polysiloxane "preblend." The preblend is then added to the remaining portion of the mill base in slow continuous or incremental additions with modest agitation such that the total addition takes place over a period of 25 minutes to 10 hours, preferably 40 minutes to 6 hours. When incremental addition is utilized, it has been found advantageous to add up to about 8 percent by weight of the preblend, more preferably 0.5 to 2.5 weight percent of the preblend at each increment, the increments spaced approximately 1–5 minutes apart, more preferably a minimum of 2 minutes, and most preferably 3 minutes apart. Thus, with 2.5 weight percent increments spaced 3 minutes apart, the entire addition of preblend to mill base will take approximately 2 hours. The preblend preferably consists of 20–80 weight percent polysiloxane and 80–20 weight percent water and/or mill base, more preferably 30–65% polysiloxane, and most preferably about 40–60% polysiloxane, the remainder preferably being mill base and/or water. The preblends advantageously contain Wacker Silicone 43A alkoxyalkyl polysiloxane or other alkoxy-functional polysiloxane in an amount of from 50 to 100% based on total polysiloxane, and 0–50% of an aminoalkyl-functional polysiloxane, preferably 0–20%, and most preferably 5–15% based on total polysiloxane. Other polysiloxanes may be used as well, for example, unsaturated photocurable or heat-curable polysiloxanes.

The topcoat is preferably applied as two layers with a total dry thickness of 10–100 $\mu$m, preferably 13–75 $\mu$m, and more preferably 30–60 $\mu$m. The topcoat is preferably applied at ambient temperatures in the 5° C. to 450° C. range, with three hours between coats. While the topcoat is preferably applied over a pigmented stain on a non-porous thermoset and/or thermoplastic surface, the inventive topcoat may be applied to other surfaces devoid of stain, and to porous surfaces, stained or unstained, as well.

Having generally described this invention, a further understanding can be obtained by reference to certain specific examples which are provided herein for purposes of illustration only and are not intended to be limiting unless otherwise specified.

EXAMPLE 1

A preferred walnut stain formulation is prepared as follows:

A mill base is prepared in a suitable container employing a high shear mixer with a high speed dispersant blade such as a Cowles blade. To approximately 85 kg of dicyclopentadiene-linseed oil copolymer, such as DILULIN™ copolymer, are added pigments such as 100 kg of burnt umber, 5 kg of red 40, and 15 kg of bone black; surfactants such as 1.8 kg of BYK™ 156 ammonium polyacrylate salt dispersant; and thickeners such as CLAYTONE™, modified montmorillonite thickener, the quantity of which is determined by the consistency desired.

After 30 minutes of blending to thoroughly wet out the pigments and to reduce the pigment size to be small enough to fit into the texture of the thermoplastic or thermoset composite surface, the mill base is diluted to volume and adjuvants blended in under high shear mixing. These include 70 kg of dicyclopentadiene-linseed oil copolymer; hindered amine light stabilizers, such as 5 kg of TINUVIN™ 292 bis(1,2,2,66-pentamethyl-4-piperidinyl)sebacate light stabilizer; and 10 kg of TINUVIN™ 328 substituted benzotriazole light stabilizer; 1.6 kg of anti-mar wax; co-solvents, such as 65 kg of solvent 142, 30 kg of tridecyl alcohol, and 50 kg of mineral spirits; drying agents, such as 5 kg of 10% calcium napthenate, 3 kg of zirconium naphthenate, and 1 kg of magnesium naphthenate; and leveling agents, such as 0.5 kg of SKINO™ methylethylketoxime anti-skinning agent.

EXAMPLE 2

A preferred topcoat formulation is prepared as follows:

A mill base is prepared in a small container in a high shear mixer by additions of 100–1000 g, preferably 725 g, ultrafine titanium dioxide, in approximately 8 L of clean water. The mixture is sheared for approximately 30 minutes at approximately 2000 rpm using a high speed dispersant blade such as a Cowles blade. To this is added flatting agent such as LOVEL™ 27 silica flatting agent, the quantity of which is dependent on the finish desired: flat, satin, semi-gloss, or glossy. Other adjuvants include rheological aids, such as modified synthetic clays for consistency, preferably 800 g of LAPONITE™ clay; surfactants such as 1675 g of BYK™ 024 defoamer and/or 425 g of BYK™ 181anionic/non-ionic wetting aid defoamer consisting of alkanolammonium salts of polyfunctional polymer; and anti-marring waxes such as SHAMROCK™ S-381 wax, the amount of which is determined by the product performance requirements, preferably 650 g.

The mill base is transferred to a larger tank and the remaining non-polysiloxane materials are blended in under high shear conditions. Approximate additions are as follows: 160 kg of urethane-acrylic hybrid polymer resin; surfactants such as 1.1 kg of BYK™ 321 polyether-modified polydimethylsiloxane copolymer and 1.8 kg of BYK™ 346 polyether-modified polydimethylsiloxane copolymer surfactant; hindered amine stabilized ultraviolet light stabilizers such as 725 g of Tinuvin™ 292 stabilizer; anti-fungal and anti-microbial adjuvants such as 650 g of POLYPHASE™ P-20-T 3-indo-2-propynylbutyl carbonate antimicrobial and 380 g of PROXEL™ GXL antimicrobial; as well as 1.8 kg co-solvent such as tridecyl alcohol.

A 20 L hydrophobicity-modifying polysiloxane preblend is prepared at 50–1000 rpm, using a Cowles blade, in a high shear mixer. The maximum agitation speed is determined by the shear sensitivity of the particular organopolysiloxane resins, while the minimum speed is determined by economics of manufacture. About 10 L of the main topcoat mixture described above is withdrawn, or as an alternative, water may be used to prepare the preblend. Solvents such as those used in topcoat preparation may not be used as they fail to mix without detrimental dispersion texture. Over a minimum period of about 20 minutes, continuous or incremental additions of main topcoat mixture or water are added to the hydrophobicity modifying preblend containing such as 9.6 kg of organopolysiloxane, for example, Wacker Silicone 43A. Adjuvant water-beading agents such as 1 kg of aminofunctional organosiloxane, for example Wacker Silicones 1306 organopolysiloxane, are added as part of the preblend.

The organopolysiloxane-containing hydrophobicity modifying preblend is added to the main topcoat mixture in continuous or incremental additions at a rate of about 1–160 mL, preferably 50 mL; or up to 8 volume % of the preblend, preferably 0.5–2.5 volume % of the preblend; spaced a minimum of 2, preferably 3 minutes apart.

Examples 3–5 and Comparative C1

The products of Examples 1 and 2 are compared to commercial stain and solvent based polyurethane topcoat by exposing finished door skins made from wood grain molded SMC. The tests were conducted with UV B313 bulbs and a test cycle of 4 hours of exposure to UV light at 60° C. followed by 4 hour exposure to condensation at 50° C., in accordance with the QUV™ Accelerated Weathering test following ASTM G53-88.

TABLE 1

| EXAMPLE | STAIN | TOPCOAT | HOURS TO FAILURE |
|---|---|---|---|
| C1 | Zar ™ mineral spirits based wood stain | Zar ™ Exterior Polyurethane | 800 |
| 3 | Example 1 stain | Zar ™ Exterior Polyurethane | 1000 |
| 4 | Zar ™ mineral spirits based wood stain | Example 2 topcoat | 3000 |
| 5 | Example 1 stain | Example 2 topcoat | 3400 |

Example C1 is a comparative example employing high quality commercial wood stain and exterior polyurethane solvent-borne topcoat. The finish system of Comparative Example C1 failed in 800 hours. By substituting the inventive stain for the commercial stain, the weatherability is extended to 1000 hours in Example 3, a 25% increase, while utilizing the same commercial topcoat. By changing the topcoat to the inventive topcoat, the weatherability of the finish system of Example 4, again employing the commercial stain, is extended dramatically to 3000 hours, an increase of 275% over the system of C1. A further increase to 3400 hours weatherability is obtained by utilizing both the inventive stain and topcoat in Example 5.

Examples 5 and 6, Comparative Examples C2 and C3

Two SMC wood grained skins were stained with high quality commercial stain and the stain of Example 1. Portions of these stained skins were topcoated with the topcoat of Example 2 and a similarly prepared topcoat formulation but devoid of organopolysiloxane. The stains were subjected to the cross-hatch adhesion test of ASTM D3359. The results are presented in Table 2. The polysiloxane-free topcoat is designated as "siloxane free."

TABLE 2

| EXAMPLE | STAIN | TOPCOAT | ADHESION |
|---|---|---|---|
| 6 | Zar ™ mineral spirits based wood stain | Example 2 | 5B |
| 7 | Example 1 stain | Example 2 | 5B |
| C2 | Zar ™ mineral spirits based wood stain | Siloxane Free | 1B |
| C3 | Example 1 stain | Siloxane Free | 0B |

The results indicate that the subject topcoat is far superior to a similar topcoat formulation containing no polysiloxane.

Example 7 and Comparative Example C4

Test door skins prepared from a variety of substrates were subjected to weatherability tests in Florida and Arizona. The test panels included a polyurethane substrate, a panel molded from sheet molding compound, and a CLASSIC CRAFT™ door skin. A total of six different pairs of substrates, most being glass fiber-reinforced, were used. One of each pair was stained with the stain of Example 1 and the topcoat of Example 2. This set of six panels constitute Example 7. The second of each pair of panels was stained with a mineral spirit-based oil stain followed by a high quality commercial topcoat, ZAR™ Exterior Polyurethane. This set of panels constitutes Comparative Example C4. Samples were exposed outdoors for a period of six months. The color change (Delta E) was measured in accordance with ASTM D2244-93, "Method for Calculation of Color Differences From Instrumentally Measured Color Coordinates." Gloss Change was measured in accordance with ASTM D523-89 "Standard Method for Specular Gloss." Color changes and gloss changes were averaged for each set of panels. The results are presented below.

TABLE 3

| PANEL SET | COLOR CHANGE[1] | GLOSS CHANGE |
|---|---|---|
| Example 7 | 4.17 | 8.12 |
| Comparative Example C4 | 15.01 | 18.89 |

[1]Average from six different panels.

Of the panels tested, the CLASSIC CRAFT™ panel and the panel prepared from sheet molding compound were the best performers overall with the inventive stain/topcoat system.

By the term "weatherability" is meant performance of stain, topcoat, or stain/topcoat systems in exterior exposure, for example corresponding to the ASTM G53-88 test. By the terms "major" or "majority" is meant 50% or more. By the term "minor" it is meant less than 50%. By "non-porous" is meant the porosity of a thermoset and/or thermoplastic article containing not more than a minor quantity of organic and/or inorganic fillers. By the term "transparent" is meant a product or film prepared therefrom which is transparent to the naked eye or slightly translucent such that newsprint may be easily read through 1 mm thickness. The term "consisting essentially of" when applied pertaining to stain resin content means that the resin contains only most minor amounts of resin other than dicyclopentadiene-modified drying oils, i.e., not more than about 10% by weight based on the total amount of resin. The resin binder preferably contains a majority of dicylopentadiene-modified drying oil, more preferably in excess of 70 weight percent, more preferably greater than 80 weight percent, and yet more preferably greater than 90 weight percent. Most preferably, this modified drying oil is the sole binder resin. By the term "thermoset and/or thermoplastic" is meant a thermoset polymer, a thermoplastic polymer, or a mixture of thermoset and thermoplastic polymers. These polymers, which may be collectively termed "plastics" may contain fillers, adjuvants, etc., as previously disclosed.

What is claimed is:

1. A weatherable stain/topcoat system, comprising:
   a) a pigmented stain comprising, in percent by weight based on the total weight of said pigmented stain:
      i) from about 15% to about 35% of one or more pigments;
      ii) from about 20% to about 45% of a resin binder comprising dicyclopentadiene-modified drying oil;
      iii) from about 20% to about 40% of at least one volatile solvent; and
   b) an aqueous topcoat, comprising
      i) from about 25 weight percent to about 55 weight percent solids based on the weight of the aqueous topcoat of one or more non-siloxane film-forming polymers, at least one of said non-siloxane film-forming polymers dispersible in water;
      ii) an emulsion of one or more curable organopolysiloxanes; and
      iii) water.

2. The system of claim 1 wherein said pigmented stain contains at least two volatile solvents, one of said two solvents being a tail solvent.

3. The system of claim 1 wherein said emulsion of one or more organopolysiloxanes is a microemulsion.

4. The system of claim 1 wherein said curable organopolysiloxanes are present in said topcoat in an amount of from about 2 to about 25 weight percent solids based on the weight of said topcoat.

5. The system of claim 1 wherein said pigmented stain
   a) comprises
      i) from about 20% to about 30% of one or more pigments;
      ii) from about 30% to about 40% of a resin binder comprising dicyclopentadiene-modified drying oil;
      iii) from about 20% to about 40% of at least two solvents having different volatilities; and
   and wherein said aqueous topcoat b) comprises
      i) from about 35 weight percent to about 45 weight percent solids based on the weight of the aqueous topcoat of one or more non-siloxane film-forming polymers, at least one of said non-siloxane film-forming polymers dispersible in water;
      ii) an emulsion of one or more curable organopolysiloxanes sufficient to supply from about 3 weight percent to about 10 weight percent organopolysiloxane solids; and
      iii) water.

6. The system of claim 1 wherein said topcoat contains a water-beading organopolysiloxane different from said curable organopolysiloxane.

7. The system of claim 1 which exhibits a weatherability as measured by ASTM G53-88 of greater than 2000 hours.

8. The system of claim 1 wherein said resin binder consists essentially of said dicyclopentadiene-modified drying oil.

9. A pigmented stain exhibiting improved weatherability when topcoated with a transparent topcoat, said pigmented stain comprising, in weight percent based on the weight of the stain;
   a) one or more pigments in amounts of from about 15% to about 35%;
   b) a resin component comprising a dicyclopentadiene-modified drying oil, said resin component present in an amount of from about 20% to about 45%;
   c) from about 20% to about 40% of at least two organic solvents having different volatilities wherein at least one of said at least two organic solvents is a tail solvent.

10. The pigmented stain of claim 9 wherein said tail solvent comprises a glycol ether, glycol acetate, or mixture thereof.

11. The stain of claim 9 wherein said stain contains from about 20 weight percent to about 30 weight percent pigment and from about 30 weight percent to about 40 weight percent resin binder.

12. The pigmented stain of claim 9 wherein said stain further comprises minimally two solvents other than said tail solvent, said two solvents having differing volatilities.

13. The pigmented stain of claim 9 wherein said resin binder consists essentially of said dicyclopentadiene-modified drying oil.

14. An aqueous topcoat which dries to form a weatherable transparent coating, said aqueous topcoat comprising
   a) from about 25 weight percent to about 55 weight percent solids based on the weight of the aqueous topcoat of at least one non-polysiloxane film forming polymer, at least one of said film forming polymers being dispersible in water, said film forming polymers present in an amount of from 25 to 55 weight percent based on the weight of said topcoat;
   b) at least one curable polysiloxane in the form of an emulsion, said curable polysiloxane present in an amount of from about 2 to 15 weight percent based on the weight of said topcoat;
   c) water; and
   wherein said film forming polymer is one or more of a urethane-modified acrylate and an aliphatic polyurethane.

15. The aqueous topcoat of claim 14 further comprising one or more surfactants in an amount effective to produce a stable dispersion.

16. An aqueous topcoat which dries to form a weatherable transparent coating, said aqueous topcoat comprising
   a) from about 25 weight percent to about 55 weight percent solids based on the weight of the aqueous topcoat of at least one non-polysiloxane film forming polymer, at least one of said film forming polymers being dispersible in water, said film forming polymers present in an amount of from 25 to 55 weight percent based on the weight of said topcoat;

b) at least one curable polysiloxane in the form of an emulsion, said curable polysiloxane present in an amount of from about 2 to 15 weight percent based on the weight of said topcoat;

c) water; and wherein said organopolysiloxane emulsion is a microemulsion.

17. An aqueous topcoat which dries to form a weatherable transparent coating, said aqueous topcoat comprising a) from about 25 weight percent to about 55 weight percent solids based on the weight of the aqueous topcoat of at least one non-polysiloxane film forming polymer, at least one of said film forming polymers being dispersible in water, said film forming polymers present in an amount of from 25 to 55 weight percent based on the weight of said topcoat;

b) at least one curable polysiloxane in the form of an emulsion, said curable polysiloxane present in an amount of from about 2 to 15 weight percent based on the weight of said topcoat;

c) water; and wherein said aqueous topcoat cures upon drying to form an interpenetrating polymer network.

18. A process for the preparation of an aqueous topcoat which dries to form a weatherable, transparent coating, said process comprising:

a) preparing a mill base comprising an aqueous dispersion of at least one film-forming polymer;

b) preparing a preblend comprising a dispersion of at least one curable organopolysiloxane dispersed in an aqueous phase;

c) gradually adding said preblend to said mill base such that a stable dispersion is obtained.

19. The process of claim 18 wherein said aqueous phase is derived from a portion of said mill base.

20. The process of claim 18 wherein said mill base further comprises one or more surfactants.

21. The process of claim 18 wherein said preblend further comprises a water beading organopolysiloxane different from said curable organopolysiloxane.

22. The process of claim 18 wherein said stable dispersion comprises a microemulsion.

* * * * *